UNITED STATES PATENT OFFICE.

SIDNEY G. THOMAS AND PERCY C. GILCHRIST, OF LONDON, COUNTY OF MIDDLESEX, ENGLAND.

PROCESS OF LINING BESSEMER CONVERTERS OR OTHER FURNACES AND THE PREPARATION OF LIME USED THEREFOR.

SPECIFICATION forming part of Letters Patent No. 241,570, dated May 17, 1881.

Application filed December 9, 1880. (No specimens.)

*To all whom it may concern:*

Be it known that we, SIDNEY GILCHRIST THOMAS and PERCY CARLYLE GILCHRIST, subjects of the Queen of Great Britain, and residing in London, England, have invented a certain new and useful Improvement in the Process of Lining Bessemer Converters or Furnaces, and in the Preparation of Lime used for such Purpose; and we do hereby declare that the following is a full, clear, and exact description of the invention, which will enable others skilled in the art to which it appertains to make and use the same.

Our invention consists in a new and improved process for lining and repairing the linings of basic-lined Bessemer converters and other furnaces, and is an improvement on the processes for which patents have been granted to Sidney Gilchrist Thomas in the United States, namely: Nos. 218,334, 218,335, and 218,336, dated August 5, 1879.

The basic linings of Bessemer converters and of furnaces are now manufactured, as described in the before-referred-to patents, of magnesian lime in the form of bricks or of a rammed material, and when extensive repairs of the lining are necessary it is requisite to cool the vessel or furnace, which causes loss of time and expense. We have found, however, that by mixing lime with a large quantity of tar, so as to give, when hot, a thickly fluid mass, repairs may be very rapidly effected without cooling the vessel or furnace, or new linings may be put in with very great rapidity. We find that this "fluid lime mixture," as we shall hereinafter call it, is best made by mixing one part, by volume, of tar with from two and a half to four parts, by volume, of lime. The lime should be previously ground to a coarse powder. The harder shrunk the lime is the less tar is required. The tar should be used hot and an intimate mixture made. In repairing Bessemer-converter bottoms this mixture is thrown in while the vessel is very hot, and sets very rapidly into a hard basic coke. In making fresh Bessemer plugs or bottoms we pour the semi-fluid mixture into a hot iron casing, such as is ordinarily used around tuyeres, or preferably around tapered steel rods forming tuyere-holes. The operation is best conducted in an ordinary bottom stove—that is, a stove in which Bessemer bottoms are dried. The stove should be at a red, or nearly red, heat. The material may be run into the mold through a funnel in the roof till the mold overflows. When the bottom casing is full it is exposed to a moderate red heat in the stove for from twenty-four (24) to sixty (60) hours, when it will be ready for use after about twenty-four hours' cooling. It is not ready for cooling till all the gas has been given off.

In repairing Bessemer-converter linings, for which our invention is particularly useful, we make a sheet or cast iron or steel mold, preferably in three or more pieces, one, at least, of which has a wedge or taper form. We prefer the mold to be in six pieces, with two wedge-pieces. The exterior of the mold has the form which it is desired to give to the interior of the converter-lining. The several pieces of which the mold is made are held together either by cross iron rods or ties fitting into sockets on the interior of the mold-pieces or any other convenient way.

In repairing a Bessemer vessel, which we prefer to be of symmetrical shape—that is, of cylindrical section in the body, with a vertical truncated cone for the throat-section, such as is now used in the process of dephosphorizing—we turn the vessel vertically, preferably throat downward, and take off the bottom section. We then, with a crane, drop the mold into the converter, which should be as hot as possible, any space left between the mold and the old converter-lining at the throat of the vessel being filled with a little lime mixed with about one-tenth of its volume of tar. Some temporary fire-bars are put in across the neck of the converter and a brisk fire kept up inside the mold. The liquid lime previously described is then poured or thrown in between the old hot lining and hot iron mold till the whole space between the mold and the old lining is filled. After a few hours the liquid lime will have set, and the mold can be readily withdrawn (first knocking out the wedge-pieces) by the crane used for setting it in place.

Instead of doing the repairs throat downward, it is sometimes more convenient to do them throat upward, for this purpose taking off the throat-section of the vessel before inserting the mold. The bottom is in this case kept on and the fire maintained by the blast. The top may be advantageously nearly covered by a bricked metal lid. By this means a converter-lining can be entirely repaired or fresh lined in under twelve hours, while three or four times as long would be otherwise required. Basic-lined cupolas and Pernot or similar removable furnace-hearths can be similarly lined.

The lime we use for mixing with the tar to make this liquid lime we greatly prefer to be shrunk magnesian lime burned at a white heat. Methods of preparing this shrunk lime have been already described in Patent No. 218,336. We have found, however, that shrunk lime for making our liquid lime is best prepared by the following process: We use a cupola-furnace, such as is used for melting iron, and line it with either basic bricks or with a rammed lining of (preferably magnesian) lime and tar, as already described in the last-mentioned Patent No. 218,336. This cupola should have a drop-bottom, and the tuyeres are best placed about six to twelve inches above the bottom. There are also left in the cupola casing and lining, at various levels above the tuyeres, eight to ten holes, inclined downward, through which iron bars can be thrust from time to time to prevent scaffolds forming. These, when not in use, are closed by caps and plugs. The lining of the cupola above the charging-door is formed, as usual, of fire-bricks supported on a ring or angle-iron at the charging-door level. In preparing this lime the cupola is filled to the charging-door level with coke. Plenty of blast—preferably at blast-furnace blast-pressure—is applied. When the coke has burned down a few inches we charge about equal volumes of coke and raw dolomite. (The dolomite may, however, be previously calcined.) The dolomite we prefer to use contains from three to nine per cent. in all of silica, alumina, and oxide of iron together, and is preferably broken into pieces not larger than the fist. The charging is continued, with somewhat diminished proportions of coke to stone, until it is found that the charge no longer sinks or sinks very slowly. The blast is then taken off and the drop-bottom is carefully lowered. The highly-calcined shrunk dolomite lime and cinder occupying the lower three or four feet of the cupola is withdrawn, and the bottom being replaced the charge is broken up by bars inserted through the clearing-holes. The blast is then turned on and the charging resumed as before until it is necessary to draw again. In this way from ten to twenty tons of shrunk lime may be produced in twenty-four hours with a consumption of considerably less than fifteen hundred weight of coke per ton of shrunk lime.

Having thus fully described our invention, what we claim, and desire to secure by Letters Patent of the United States, is—

1. The improvement in lining Bessemer converters or furnaces by and with a fluid mixture of lime and tar, substantially as and for the purposes set forth.

2. The improvement in preparing limestone or lime to be used in the lining of Bessemer converters or furnaces by shrinking the said limestone or lime at an intense white heat in a basic-lined cupola, substantially as set forth.

SIDNEY GILCHRIST THOMAS.
PERCY C. GILCHRIST.

Witnesses:
C. W. MORSE,
   *Of Redcar Road, South Bank.*
C. LIDDEE,
   *Of Middlesbro, Yorkshire.*